US012724818B2

(12) United States Patent
Evangelho Feliciano et al.

(10) Patent No.: US 12,724,818 B2
(45) Date of Patent: Sep. 1, 2026

(54) COMPUTER-IMPLEMENTED METHOD, DEVICE AND SYSTEM FOR GENERATING AND PROVIDING AN INTERACTIVE GRAPHICAL USER INTERFACE

(71) Applicant: FEEDZAI—CONSULTADORIA E INOVAÇÃO TECNOLÓGICA, S.A., Coimbra (PT)

(72) Inventors: Beatriz Evangelho Feliciano, Coimbra (PT); Javier Liébana de la Barrera, Coimbra (PT); Leonardo de Oliveira Vieira Alves, Coimbra (PT); Rita Marques Costa, Coimbra (PT); Diogo Ramalho Duarte, Coimbra (PT); Pedro Gustavo Santos Rodrigues Bizarro, Coimbra (PT)

(73) Assignee: FEEDZAI—CONSULTADORIA E INOVAÇÃO TECNOLÓGICA, S.A., Coimbra (PT)

( * ) Notice: Subject to any disclaimer, the term of this patent is extended or adjusted under 35 U.S.C. 154(b) by 0 days.

(21) Appl. No.: 18/820,796

(22) Filed: Aug. 30, 2024

(65) Prior Publication Data

US 2025/0335489 A1 Oct. 30, 2025

(30) Foreign Application Priority Data

Apr. 29, 2024 (PT) .......................................... 119437
May 2, 2024 (PT) .......................................... 119445

(51) Int. Cl.
*G06F 16/00* (2019.01)
*G06F 16/34* (2019.01)
*G06F 16/358* (2025.01)

(52) U.S. Cl.
CPC .......... *G06F 16/358* (2019.01); *G06F 16/345* (2019.01)

(58) Field of Classification Search
CPC ............................. G06F 16/358; G06F 16/345
See application file for complete search history.

(56) References Cited

U.S. PATENT DOCUMENTS 8,060,423 B1 * 11/2011 Rukonic ................ G06Q 40/02 707/950
11,170,375 B1 * 11/2021 Kramme ............ G06Q 30/0185

(Continued)

OTHER PUBLICATIONS

Holistic evaluation of language models (HELM). https://crfm.stanford.edu/helm/lite/latest/#/ leaderboard. Accessed: Apr. 16, 2024. [4 pages].

(Continued)

*Primary Examiner* — Syed H Hasan
(74) *Attorney, Agent, or Firm* — Leason Ellis LLP

(57) ABSTRACT

An interactive graphical user interface is generated and provided. Transactional data records are received, each comprising a plurality of data attributes. Using the data attributes, each received data record is classified into zero, one or more classes of a first classification. Each previously classified data record is classified into zero, one or more classes of a second classification, using the data attributes and the first classification. A user selection of a class of the first classification is received and a text summary for the received data records having been attributed the selected class is generated. The text summary is fed to the graphical user interface. The text summary includes the class or classes attributed by the second classification attributed to the received data records having been attributed the selected class. A graphic representation for the selected class is generated.

11 Claims, 10 Drawing Sheets

(56) References Cited

U.S. PATENT DOCUMENTS

| | | | | |
|---|---|---|---|---|
| 2015/0026027 | A1* | 1/2015 | Priess | G06Q 10/04 705/35 |
| 2016/0314146 | A1* | 10/2016 | Carothers | G06F 16/38 |
| 2018/0027006 | A1* | 1/2018 | Zimmermann | H04L 63/0227 726/11 |
| 2021/0073819 | A1* | 3/2021 | Hernandez | G06Q 20/4016 |
| 2021/0211443 | A1* | 7/2021 | Sullivan | G06N 5/04 |
| 2022/0129923 | A1* | 4/2022 | Kelton | G06Q 30/0202 |
| 2024/0086815 | A1* | 3/2024 | Galow | G06F 16/358 |
| 2024/0249081 | A1* | 7/2024 | UzZaman | G06F 40/40 |
| 2024/0338378 | A1* | 10/2024 | Setlur | G06F 16/243 |
| 2025/0061291 | A1* | 2/2025 | Gardner | G06F 40/56 |

OTHER PUBLICATIONS

Alvi et al. “Deep learning approach on tabular data to predict early-onset neonatal sepsis”, Journal of Information and Telecommunication, 5(2):226-246, 2021. [22 pages].
Amarasinghe et al. “On the importance of Application-Grounded Experimental Design for Evaluating Explainable ML Methods”, In Proceedings of the AAAI Conference on Artificial Intelligence, vol. 38, pp. 20921-20929, 2024. [9 pages].
Branco et al. “Interleaved sequence RNNs for fraud detection”, In Proceedings of the 26th ACM SIGKDD International Conference on Knowledge Discovery & Data Mining, KDD ’20, p. 3101-3109, New York, NY, USA, 2020. Association for Computing Machinery. [9 pages].
Cao et al. “Targetvue: Visual analysis of anomalous user behaviors in online communication systems”, IEEE Transactions on Visualization and Computer Graphics, 22(1):280-289, 2016. [10 pages].
Cobbe et al. “Training verifiers to solve math word problems”, arXiv preprint arXiv:2110.14168, 2021. [22 pages].
De-Arteaga et al. “A case for humans-in-the-loop: Decisions in the presence of erroneous algorithmic scores”, In Proceedings of the 2020 CHI Conference on Human Factors in Computing Systems, pp. 1-12, 2020.
DOI. “Effective highlighting modes of graphical user interfaces in visual information search”, Universal Access in the Information Society, 22(1):111-119, Jul. 2023.
Fernandes et al. “Bridging the gap: A survey on integrating (human) feedback for natural language generation”, Transactions of the Association for Computational Linguistics, 11:1643-1668, 2023.
Gao et al. “Retrieval-augmented generation for large language models: A survey”, arXiv preprint arXiv:2312.10997, 2023.
Heer et al. “Interactive dynamics for visual analysis”, Commun. ACM, 55(4):45-54, Apr. 2012.
Holtzman et al. “The curious case of neural text degeneration”, arXiv preprint arXiv: 1904.09751, 2019.
Hopkins et al. “Visualint: Sketchy in situ annotations of chart construction errors”, Computer Graphics Forum, 39(3):219-228, Jul. 2020.
Hu et al. “Dive: A mixed-initiative system supporting integrated data exploration workflows”, In Proceedings of the Workshop on Human-In-the-Loop Data Analytics, HILDA ’18, New York, NY, USA, Jun. 2018. Association for Computing Machinery.
Jin et al. “What disease does this patient have? a large-scale open domain question answering dataset from medical exams”, Applied Sciences, 11(14):6421, 2021.
Kandpal et al. “Large language models struggle to learn long-tail knowledge”, In International Conference on Machine Learning, pp. 15696-15707. PMLR, 2023.
Keim et al. “Visual Analytics: Scope and Challenges”, pp. 76-90. Springer Berlin Heidelberg, Berlin, Heidelberg, 2008.
Kielman et al. “Foundations and frontiers in visual analytics”, Information Visualization, 8(4):239-246, Dec. 2009.
Kinkeldey et al. “BitConduite: Visualizing and Analyzing Activity on the Bitcoin Network”, In A. P. Puig and T. Isenberg, editors, EuroVis 2017—Posters. The Eurographics Association, 2017.
Kute et al. “Deep learning and explainable artificial intelligence techniques applied for detecting money laundering—a critical review”, IEEE Access, 9:82300-82317, 2021.
Kwiatkowski et al. “Natural questions: A benchmark for question answering research”, Transactions of the Association for Computational Linguistics, 7:453-466, 2019. [14 pages].
Law et al. “Characterizing automated data insights”, In 2020 IEEE Visualization Conference (VIS), pp. 171-175, Oct. 2020. [5 pages].
Lee et al. “Avoiding drill-down fallacies with VisPilot: assisted exploration of data subsets”, IUI ’19, p. 186-196, New York, NY, USA, Mar. 2019. Association for Computing Machinery. [11 pages].
Lee et al. “Factuality enhanced language models for open-ended text generation”, Advances in Neural Information Processing Systems, 35:34586-34599, 2022. [14 pages].
Leite et al. “Visual analytics for event detection: Focusing on fraud”, Visual Informatics, 2(4):198-212, Dec. 2018. [15 pages].
Leite et al. “EVA: Visual analytics to identify fraudulent events”, IEEE Transactions on Visualization and Computer Graphics, 24(1):330-339, 2018. [10 pages].
Lewis et al. “Retrieval-Augmented Generation for Knowledge-Intensive NLP tasks”, Advances in Neural Information Processing Systems, 33:9459-9474, 2020. [16 pages].
Liang et al. “Holistic evaluation of language models”, arXiv preprint arXiv:2211.09110, 2022. [162 pages].
Lin et al. “TruthfulQA: Measuring how models mimic human falsehoods”, arXiv preprint arXiv:2109.07958, 2021. [39 pages].
Liu et al. “Mtv: Visual analytics for detecting, investigating, and annotating anomalies in multivariate time series”, Proc. ACM Hum.-Comput. Interact., 6(CSCW1), Apr. 2022. [30 pages].
Lundberg et al. “A unified approach to interpreting model predictions”, Advances in neural information processing systems, 30, 2017. [10 pages].
Maçãs et al. “GlyphSOMe: Using SOM with data glyphs for customer profiling”, In Proceedings of the 15th International Joint Conference on Computer Vision, Imaging and Computer Graphics Theory and Applications (VISIGRAPP 2020)—IVAPP, pp. 301-308. INSTICC, SciTePress, 2020. [8 pages].
Maçãs et al. “ATOVis—a visualisation tool for the detection of financial fraud”, Information Visualization, 21(4):371-392, 2022. [22 pages].
Manakul et al. “SelfcheckGPT: Zero-resource black-box hallucination detection for generative large language models”, arXiv preprint arXiv:2303.08896, 2023. [14 pages].
Mu et al. “MOOCad: Visual Analysis of Anomalous Learning Activities in Massive Open Online Courses”, In J. Johansson, F. Sadlo, and G. E. Marai, editors, EuroVis 2019—Short Papers. The Eurographics Association, 2019. [5 pages].
Nguyen et al. “Vasabi: Hierarchical user profiles for interactive visual user behaviour analytics”, IEEE Transactions on Visualization and Computer Graphics, 26(1):77-86, 2020. [12 pages].
Obeid et al. “Chart-to-text: Generating natural language descriptions for charts by adapt ing the transformer model”, In Proceedings of the 13th International Conference on Natural Language Generation, pp. 138-147. Association for Computational Linguistics, Oct. 2020. [10 pages].
Open AI. “Gpt-4 technical report”, arXiv preprint arXiv:2303.08774, 2023. [100 pages].
Ramaiya et al. “A colossal $159 billion lost to fraud and scams, finds new research from Feedzai and the Global Anti-Scam Alliance”, Feb. 2024.
Ribeiro et al. “why should i trust you?” explaining the predictions of any classifier, In Proceedings of the 22nd ACM SIGKDD international conference on knowledge discovery and data mining, pp. 1135-1144, 2016. [10 pages].
Rzeszotarski et al. “Crowdscape: interactively visualizing user behavior and output”, In Proceedings of the 25th Annual ACM Symposium on User Interface Software and Technology, UIST ’12, p. 55-62, New York, NY, USA, 2012. Association for Computing Machinery. [8 pages].
Sheikh et al. “An approach for prediction of loan approval using machine learning algorithm”, In 2020 international conference on electronics and sustainable communication systems (ICESC), pp. 490-494. IEEE, 2020.

(56) References Cited

OTHER PUBLICATIONS

Silva et al. "Visualisation tool to support fraud detection", In 2021 25th International Conference Information Visualisation (IV), pp. 77-87, 2021.
Strobelt et al. "Guidelines for effective usage of text highlighting techniques", IEEE Transactions on Visualization and Computer Graphics, 22(1):489-498, Jan. 2016. [10 pages].
Sultanum et al. "Datatales: Investigating the use of large language models for authoring data-driven articles", In 2023 IEEE Visualization and Visual Analytics (VIS), pp. 231-235, Oct. 2023. [5 pages].
Tang et al. "Vistext: A benchmark for semantically rich chart captioning", arXiv preprint arXiv:2307.05356, Jun. 2023. [29 pages].
Touvron et al. "Llama: Open and efficient foundation language models", arXiv preprint arXiv:2302.13971, 2023. [27 pages].
Wei et al. "Chain-of-Thought Prompting Elicits Reasoning in Large Language Models", 36th Conference on Neural Information Processing Systems (NeurIPS 2022). [14 pages].
Zhang et al. "Siren's song in the ai ocean: a survey on hallucination in large language models", arXiv preprint arXiv:2309.01219, 2023. [33 pages].
Zhao et al. "#fluxflow: Visual analysis of anomalous information spreading on social media", IEEE Transactions on Visualization and Computer Graphics, 20(12):1773-1782, 2014. [10 pages].

* cited by examiner

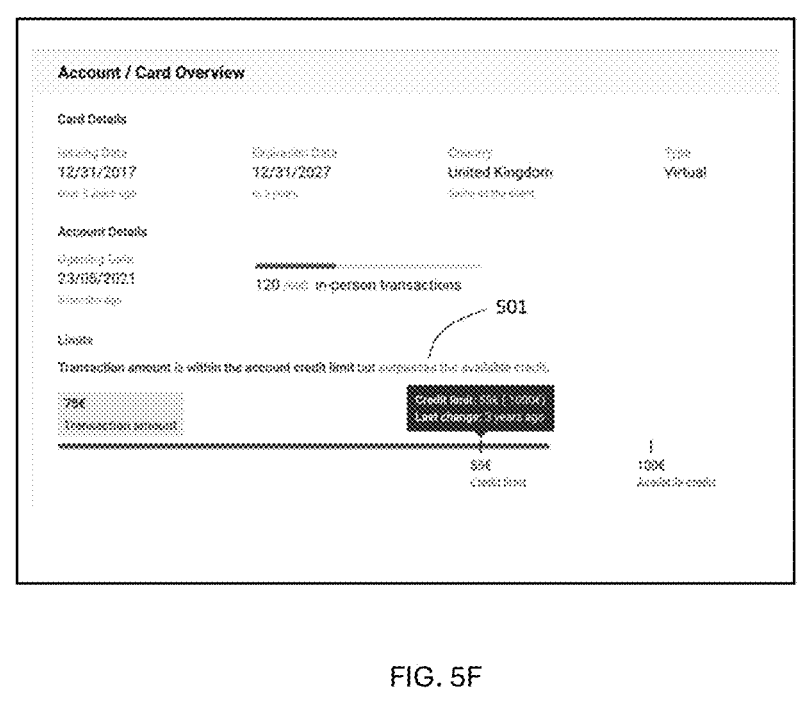

Account / Card Overview

Card Details

12/31/2017

12/31/2027

United Kingdom

Virtual

Account Details

23/08/2021 in-person transactions

501

Transaction amount is within the account credit limit

FIG. 5F

COMPUTER-IMPLEMENTED METHOD, DEVICE AND SYSTEM FOR GENERATING AND PROVIDING AN INTERACTIVE GRAPHICAL USER INTERFACE

CROSS-REFERENCE

This application claims the benefit of priority under 35 U.S.C. § 119(e) from Portugal Patent Application No. 119437, filed on Apr. 29, 2024 and Portugal Patent Application No. 119445, filed May 2, 2024, which is hereby incorporated by reference as if set forth in its entirety herein.

TECHNICAL FIELD

The present disclosure refers, generally, to data processing applications and, more particularly, to improved analysis and navigation of multi-dimensional data.

BACKGROUND

Data exploration for risk analysis is a crucial task in multiple domains, such as financial loan approval, medical diagnostics, and financial fraud detection. Analysts must, among other tasks, compare a current event (e.g., a loan application, health exam parameters, or performed transaction) with historical information, such as, previous loans, patient history, or transactions over time. To this end, domain experts carry out a non-linear and iterative data exploration process based on tabular data, which makes exploring information and detecting events a complex, fatiguing, and time-consuming task.

Fraud and scams resulted in the loss of 159 billion dollars in the USA in 2023. In the process of reviewing a financial fraud alert, a fraud analyst is confronted with hundreds or even thousands of data points that they explore and analyse to reach conclusions. Adding to the complexity of the issue, these processes must be carried out in a rapid manner, in a few minutes or even seconds. Analysts frequently come across multiple data aggregations and may need to switch from an overall view to a more granular exploration of a given high level concept (e.g., geographical information). These changes in granularity frequently lead to a loss in overall context. Additionally, financial analysts often work alongside automated systems designed to aid them in their decision-making, by providing a risk estimate in the form of a "risk-score", and even by performing risk-attribution, identifying which variables contribute to an elevated risk-score, if any. This adds further complexity to the task, as analysts are not only required to evaluate the data themselves, but also to incorporate the automated system's insights in their judgement.

To aid in these issues and leverage human perception, current research proposes different solutions, from data summarization—through graphical representations or textual descriptions—to information highlighting and exploration through multiple levels of detail. These techniques alone can impose some limitations on the data evaluation, such as information overload.

Event detection is an analytics problem that requires visual exploration. Consequently, it is common to graphically represent this multi-level data and its attributes.

One commonly used approach is to visually encode each relevant data attribute through different graphical representations adjusted to the attribute characteristics and the insights that users are looking for. There are also systems that perform automatic recommendations of graphical representations according to the data attributes or sub-sets of data attributes. However, these techniques can be inadequate for time-constrained use cases, as they require manually editing the charts for insight retrieval and report generation. Additionally, while visualizations ease the retrieval of insights by taking advantage of the human perception system, the approaches mentioned above either tend to represent each attribute individually or fail to tailor the visualizations presented to the user, which can lead to an overwhelming data exploration process.

Another frequently used technique to explore multi-dimensional datasets is to encode multiple data attributes in a unique visualization through the usage of glyph representations. While these approaches reduce the amount of graphs that the user needs to evaluate, they increase the visualization complexity by requiring users to memorize multiple complex visual encodings, which take more time to interpret.

Text descriptions about data and charts are a growing technique used to communicate and summarize insights such as outliers, data values, extremes, and trends. By reading a text description summarizing the data at hand, users can gain an early advantage in the analysis.

Despite the usefulness of this approach in helping users understand the data and its distribution, these insights are more commonly generated by Large Language Models (LLMs), which can output inaccurate information (e.g., hallucinations). Consequently, the unchecked use of LLMs introduces a possibility that the text summary includes misleading or deceptive conclusions, which, in turn, can harm the analyst's information retrieval. To minimize this issue, the state of the art emphasizes the importance of giving users means to confirm the information present in the LLM generated description—for example, by allowing access to tabular or graphical representations of the dataset.

To avoid data overload and facilitate information digestion, data is usually divided into multiple levels of detail or granularity, allowing users to evaluate summarized or grouped data, and to explore, in full detail, smaller portions of the information.

Current research focuses mainly on the usage of this technique combined with visual analytics approaches, though users also benefit from high-level insights provided in text format, as they have proved to support initial data exploration.

Highlighting important information within text or through annotations within charts is a way of directing users' attention to specific details. In the context of data exploration, information highlighting can guide the analysis process. However, if the wrong information is highlighted, there is a potential to mislead analysts or delay their decision-making. As such, those techniques should be accompanied by an explanation of the highlighting identification process.

The wealth of data on which modern LLMs are trained not only allows for remarkable natural language processing capabilities, but also for a vast amount of knowledge in a wide range of fields.

Recently developed models, such as the currently available version of GPT-4, provide extremely high accuracy in mathematical reasoning tasks and even in answering professional medical board exam questions.

Unfortunately, there are limitations inherent to pre-trained LLMs, especially in domain specific and knowledge-intensive tasks, where the model's performance is harmed significantly if the number of task-relevant documents during pre-training is reduced. This is also an issue if the task requires current information. Furthermore, as LLMs become larger, their propensity to hallucinate false statements has been shown to increase, replicating commonly believed falsehoods. This phenomenon may occur due to the use of massive training data, which makes it difficult to curate the data for factually incorrect, biased, or outdated information.

To tackle several of the issues raised herein, Retrieval-Augmented Generation (RAG) has been proposed as a technique to enhance a LLM's performance and reduce the likelihood of incorrect generations by retrieving relevant information from an external knowledge base and adding it to the prompt. There are several approaches for RAG implementation.

RAG has been shown to significantly improve a model's performance with minimal costs. A publicly available, up-to-date benchmark for LLMs across several scenarios includes the Natural Questions dataset in which each model is prompted to answer anonymized Google queries, either omitting (closed-book) or including (open-book) a Wikipedia page that contains the information needed to answer the question in the model's prompt. This benchmark demonstrates significant performance gains from the closed-book to the open-book scenarios, in some cases, up to doubling a model's performance.

There are several hallucination prevention methods that can be applied in various phases of the LLM development process. The mitigation of the propensity for hallucinations starts at the pre-training step, where the developers of Llama 2, for example, up-sample data from highly factual sources when constructing the pre-training dataset. The same approaches to improving the quality of the available data can also be applied to subsequent supervised fine-tuning steps. Currently available advanced LLMs such as Llama2-Chat and GPT-4 conduct an additional training step: reinforcement learning from human feedback, which involves training a reward model as a proxy for human preference, and further optimizing the model using reinforcement learning strategies. While these approaches result in more reliable models, they require massive amounts of data and incur extremely high computational costs, making them unfeasible in many applications. Furthermore, the currently available highest performing models are closed-source, meaning that developers may not be able to easily manipulate and fine-tune these models at will.

For hallucination mitigation, altering the model's decoding strategy, that is, determining how output tokens are chosen from the output probability distribution, may be possible. A common approach for token decoding is nucleus sampling, which is more commonly known as "top-p sampling". This strategy involves sampling each subsequent token only from the top candidates with total cumulative probability p, thus introducing some randomness into the text generation. Top-p sampling is widely used by LLMs as it mitigates the degeneration problems (e.g., repetition) of the greedy decoding algorithm, which simply selects the token with the highest log-probability. Alternatively, this sampling method can also be parameterized by defining the number of highest log-probability tokens from which the token can be selected, which is often referred to as top-k sampling. However, the greedy decoding approach significantly reduces the number of model hallucinations when compared to top-p/top-k sampling. Currently available black-box APIs such as OpenAI's API or AWS Bedrock do not allow for a direct modification of the token decoding algorithm, but most allow for modification of the top-p or top-k p and k values.

An alternate approach involves leveraging uncertainty estimation for detecting hallucinations in LLMs. Since a black-box setting is assumed, methods which leverage the log-probabilities of the generated tokens are not applicable, leaving us with two possible options: verbalize-based estimation, which involves asking the LLM to provide an uncertainty estimate along with their answer, and consistency-based estimation, which involves quantifying uncertainty by comparing the variability between responses when querying the model with the same prompt. SelfCheckGPT, for example, computes the semantic similarity between separate responses for the same prompt. One or more of these approaches can be included in our method in order to further mitigate hallucination risks.

BRIEF SUMMARY

One or more implementations of the present disclosure include a computer-implemented method or system for generating and providing an interactive graphical user interface. A plurality of transactional data records are received by at least one computing device, each data record of said transactional data records comprising a plurality of data attributes; each received data record is classified into zero, one or more classes of a first classification, using said data attributes to attribute the first classification; each previously classified data record is classified into zero, one or more classes of a second classification, using said data attributes and first classification to attribute the second classification; a user selection of a class of the first classification is received; a text summary of the received data records and corresponding classifications is generated and said summary is provided to a graphical user interface; wherein the text summary includes the class or classes attributed by said second classification attributed to the received data records having been attributed the selected class; and generating a graphic representation for the selected class.

In one or more implementations of the present disclosure, generating a text summary further comprises generating a text summary of the class or classes attributed by said first classification and further comprises generating a text summary of the class or classes attributed by said second classification.

In one or more implementations of the present disclosure, the received plurality of transactional data records is provided as tabular data to the graphical user interface.

In one or more implementations of the present disclosure, the generated text summary, the generated graphic representation, and the tabular data can be displayed by the graphical user interface.

In one or more implementations of the present disclosure, the generated graphic representation is generated or provided to the graphical user interface.

In one or more implementations of the present disclosure, the classes obtained from said first classification are displayed.

In one or more implementations of the present disclosure, the second classification is orthogonal in respect to the first classification, i.e. the first and second classification are independent from each other.

In one or more implementations of the present disclosure, the classes obtained from said first classification are displayed, wherein first classification classes for which a preponderance of a class from said second classification are highlighted.

In one or more implementations of the present disclosure, a part or parts of the generated text summary can be highlighted, in particular the part or parts corresponding to a class or classes from said second classification attributed to the received data records having been attributed the selected class.

In one or more implementations of the present disclosure, a part or parts of the generated graphic representation can be highlighted, in particular the part or parts corresponding to a class or classes from said second classification attributed to the received data records having been attributed the selected class, further in particular the part or parts being those corresponding to a class or classes from said second classification above a predetermined classification threshold.

In one or more implementations of the present disclosure, the steps from user selection to generation, or from user selection to displaying if existing, are time-constrained, in particular is user-interactive time-constrained.

In one or more implementations of the present disclosure, the generation of a text summary for the selected class comprises generating a prompt asking for a text summary of the selected class received data records and the class or classes from said second classification attributed to the selected class received data records, feeding a text generator model the generated prompt to obtain a generated text summary; and/or verifying the generated text summary for generated text hallucination, in particular the feeding a text generator model the generated prompt to obtain a generated text summary using a GPU or NPU.

In one or more implementations of the present disclosure, the text generator model is an LLM, in particular a transformer-based model.

In one or more implementations of the present disclosure, the first classification is Knowledge Area (KA) based, thus each class being attributed in respect of a KA, the KAs being predetermined.

In one or more implementations of the present disclosure, the second classification is risk based, thus each class being attributed in respect of a risk class, the risk classes being predetermined.

In one or more implementations of the present disclosure, classifying comprises applying a pretrained discriminative model, in particular the pretrained discriminative model comprising feature embedding pre-obtained from training transactional data records and corresponding classification, in particular the classifying uses a GPU or NPU.

In one or more implementations of the present disclosure, the generated text summary is verified for generated text hallucination comprising one or more of: verifying if all data present in the generated text summary is present in the received data records or present in numerical statistics computed from the received data records, in particular the numerical statistics comprising average, sum, median, deviation, minimum or maximum; obtaining from the text generator model a plurality of generated text summaries and verifying if numerical data present in said plurality of generated text summaries are present in all generated text summaries; previously including instructions in the prompt for explicitly generating precalculated numerical statistics computed from the received data records and verifying if all numerical data present in the generated text summary is present in the precalculated numerical statistics.

In an embodiment, the method further comprises verifying the generated text summary for generated text hallucination comprising one or more of: verifying if all numerical data present in the generated text summary is present in the received data records or present in numerical statistics computed from the received data records, in particular the numerical statistics comprising average, sum, median, deviation, minimum or maximum; obtaining from the text generator model a plurality of generated text summaries and verifying if data (e.g., numerical data, textual data, lexical data, syntactic data, contextual data) present in said plurality of generated text summaries are present in all generated text summaries; previously including instructions in the prompt for explicitly generating precalculated numerical statistics computed from the received data records and verifying if all numerical data present in the generated text summary is present in the precalculated numerical statistics.

It is also disclosed a computer program product embodied in a non-transitory computer-readable medium comprising computer program instructions, which when executed by a computer processor, cause the computer processor to carry out the disclosed method.

It is further disclosed a computer system for generating and providing an interactive graphical user interface of multi-dimensional data, comprising a computer processor configured to carry out the disclosed method.

In an embodiment, the computer processor being further configured for providing: an input module configured to receive data from a plurality of sources; a processing engine for applying machine learning model or models based on user-defined selection or selections to the received data for generating text and graphical summaries of the received data; a visualization module for rendering the generated interactive graphical and textual summaries.

The computer-implemented method, device and/or system for generating and providing an interactive graphical user interface substantially as described and illustrated in any of the embodiments of the description and/or drawings.

It is proposed a system, including a user interface promoting time-efficient and highly informed decision-making. For example, this is achieved by combining a multi-modal summary of the available data, both in textual and visual representations.

Furthermore, the system integrates the insights of diverse fraud detection methods, leveraging them to produce data representations that convey the key risk-assessment insights gathered by four automated systems.

In an embodiment, the system combines multi-modal representations with highly-complex risk-assessment techniques to generate highly interpretable visualizations that reduce information overload, thus allowing a more effective data evaluation for highly complex, multi-dimensional domains.

The disclosed solution is applicable to several domains, for example, health data, stock markets, or financial fraud detection.

BRIEF DESCRIPTION OF THE DRAWINGS

The following figures provide preferred embodiments for illustrating the disclosure and should not be seen as limiting the scope of invention.

FIGS. 5A-5F illustrate example graphical representations illustrating different embodiments of KAs, in accordance with one or more implementations of the present disclosure.

DETAILED DESCRIPTION

Figure 1:
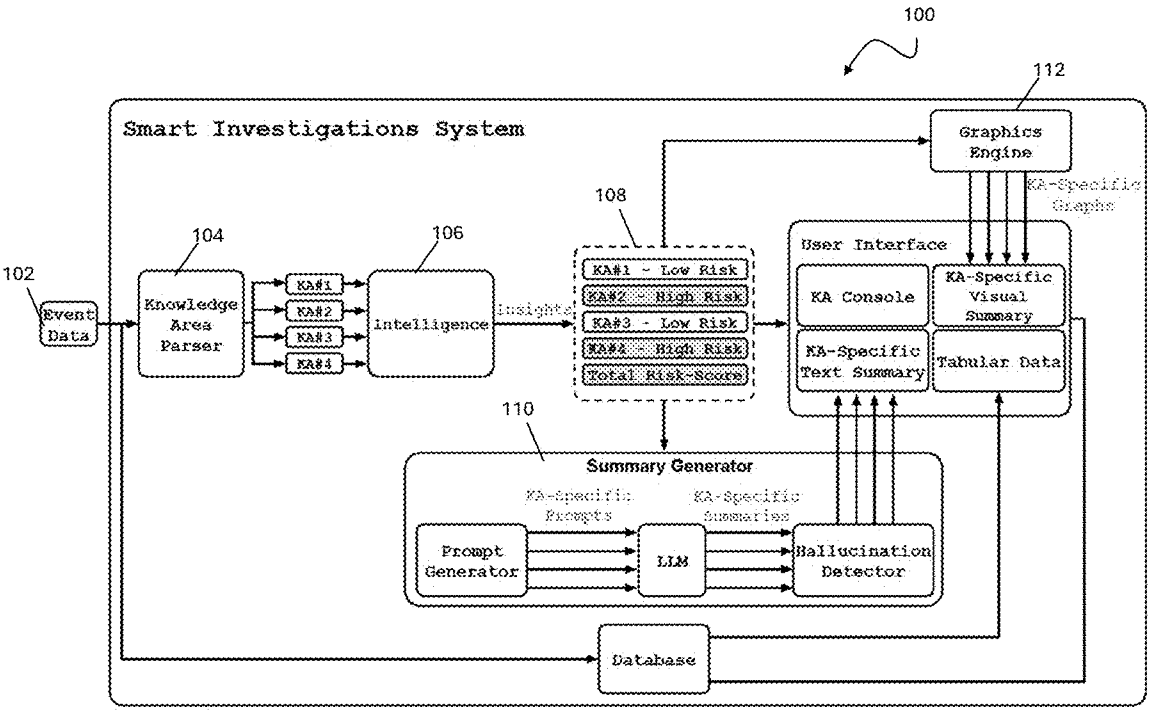
FIG. 1 is a flowchart representation illustrating an example computer-implemented method for generating and providing an interactive graphical user interface.

The present disclosure relates to a computer-implemented method, device and system for generating and providing an interactive graphical user interface, a computer-implemented method, device and system designed to enhance the interpretation and navigation of complex, multi-dimensional data through an interactive interface.

Briefly, as will be appreciated, systems and methods consistent with this disclosure can be performed by software or firmware in machine readable form on a tangible (e.g., non-transitory) storage medium. For example, the software or firmware can be in the form of a computer program including computer program code adapted to cause the system to perform the monitoring and various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously. The code utilized by one or more implementations of the present invention comprise instructions that control the processor to execute methods, such as detailed herein. The instructions can comprise a program, a component, a single module, or a plurality of modules that operate in cooperation with one another. More generally, the code comprises a portion of an implementation implemented as software. The component(s) or module(s) that comprise a software implementation can include anything that can be executed by a computer such as, for example, compiled code, binary machine level instructions, assembly code, source level code, scripts, function calls, library routines, and the like. In other implementations, the code can be implemented in firmware or a hardware arrangement.

The present method assists analysts in navigating and interpreting complex and multi-dimensional data. It also mitigates the information overload inherent to this task by combining automated textual data insights, information highlight, visual analytics, and multiple levels of detail exploration techniques.

The present disclosure provides technical solutions to various technical problems. Identification of KAs require attention. Users should be able to easily assess all the different areas that compose the data and to quickly understand which ones might require more careful analysis.

Summarization of key information within a KA. Users should easily retrieve the main takeaways of each KA: the mean of the values, trends (ascending or descending), extremes, differences, among others.

Detailed exploration of the attributes of a KA. All the data related to each KA should be present in the system, allowing users to gather detailed concept-specific information. Comparison between an individual data point (currently alerted transaction) and groups of data points (historic of transactions). Users should be able to compare the currently examined event with all the other data points in the dataset.

Considering the mentioned requirements, an overlap with other scenarios further the specific case of fraud analysis, such as medical diagnosis or stock value analysis, is evident.

Due to the extremely high volume of events being monitored, analysts are tasked with reviewing complex multi-dimensional datasets, sometimes in a matter of minutes or even seconds. Not only that, analysts must also compare the current event's information with previous occurrences, in order to analyse patterns in the data.

The present disclosure addresses, among other things, a challenge of information overload, which can be inherent to data exploration tasks, by providing an innovative data visualization interface, comprising a combination of automatically generated textual data insights, graphical analytics, and concept-based exploration techniques across multiple levels of detail.

FIG. 1 shows a flowchart representation of an embodiment of a computer-implemented method for generating and providing an interactive graphical user interface.

The event input data is fed into the method (step 102), being stored in the Database component. Then, it is fed into the Knowledge Area Parser (step 104), which maps the input data to a pre-defined number of knowledge areas, representing various concepts within the classification task at hand (e.g., demographic information, geographic information).

In an embodiment, after segmentation, the input data is then fed into an Intelligence Component (step 106) whose function is to produce an overall risk-assessment (e.g. risk of disease, risk of fraudulent activity), and to identify which KAs contain the data most responsible for a high-risk assessment (step 108). The processed data, along with the Intelligence Component's risk assessment is sent to two sub-methods responsible for producing informative data visualizations: the Summary Generator (step 110) and Graphics Engine (step 112).

In an embodiment, the Summary Generator is responsible for producing a set of short textual summaries of the data pertaining to each specific KA, providing the method's judgements on risk-assessment and risk-attribution.

In an embodiment, this sub-method follows a Retrieval-Augmented Generation (RAG) approach, comprising three components: a Prompt Generator, responsible for framing and contextualizing the necessary data and risk-assessment information for summary generation; an LLM, which given each prompt produces a KA specific summary, placing special emphasis on data responsible for a high risk-score; and, finally, an Hallucination Detector, which checks the generated summary for the introduction of factually incorrect information, failed textual generation, summary length, among other preventive measures ensuring the quality of the generated text.

In an embodiment, the Graphics Engine comprises a set of pre-defined graphical representation approaches, which may vary across KAs, designed to produce simple yet informative visualizations with no additional user input. This method also specifically highlights, graphically, the data responsible for an elevated risk-assessment.

In an embodiment, having obtained the method's risk-assessment and attribution insights, as well as a textual and graphical summary of the data, this information is fed to the User Interface (UI), which comprises four separate components: 1. A Knowledge Area Console, 2. A Textual Summary by KA, 3. A Graphical Representation per KA and 4. A Tabular representation of the data.

In an embodiment, the Knowledge Area Console allows users to select which textual and visual summaries are displayed in the two other widgets, while the traditional tabular representation is included should a user require a deeper dive into the data.

In an embodiment, as a last step, the method's risk-assessment, risk-attribution, generated textual/visual summary and the analysts decision is then stored in the database for future retrieval without requiring the processing steps.

The database contains data pertaining to previous events (e.g. transactions, patient records).

In an embodiment, the entirety of the method's outputs (i.e. visual and graphical representations as well as Intelligence component insights) are stored when an event is first analysed by the method. This would accelerate retrieval of the textual and visual representations for a given event, as well as previous method insights, at the cost of higher memory usage. This measure, however, may accelerate analysts' decision making should they need to check a previous case's output in their decision-making process.

In an embodiment, after receiving the input data, the Knowledge Area Parser component maps each variable into pre-determined KAs. Due to the specific challenges and properties of different use cases, domain experts must pre-define each KA and the parsing methods to segment the data into these fields.

In a transaction scenario, e.g., for fraud detection, KAs may include: client overview (e.g. demographic information such as name and address); location overview (e.g. the alerted client's address and where they performed past transactions); flow balance overview (e.g. balance between incoming and outgoing transacted amounts); account/card overview (e.g. credit limit, available credit, and account opening date); counterpart overview (e.g. demographic information such as name and address; past fraud cases; and past interactions with the client); and client activity overview (e.g.: past transactions amount, hour of the day, and day of the week). These are just some of the potential KAs that apply to the fraud detection scenario, other scenarios may include the KAs relevant for that study (e.g. on medical diagnosis, different health parameters would define different KAs).

The division of the input variables into different concepts serves the purpose of more intuitively representing the risk-assessment (the quantification of the risk associated with a given event) and risk-attribution (the identification of which aspects of an event make it high risk) insights provided by the Intelligence Component, described in the subsequent section.

In an embodiment, the output of the Knowledge Area Parser is a dictionary, mapping each individual variable to a single KA.

The Intelligence Component serves two separate functions: risk-assessment and risk-attribution, that is, quantifying the risk associated with a given event, and, in the case of an alert, identifying which KAs represent the information responsible for an elevated risk score.

In an embodiment, the Intelligence Component receives only the raw data and the output of the Knowledge Area Parser, allowing it to establish a variable-concept relationship. This means that any required data pre-processing is conducted by the Intelligence Component itself.

The Intelligence Component produces two outputs: a risk-score (e.g., the risk of being affected by a particular disease or health condition), quantifying the overall risk associated with an event; and, should the risk-score be elevated according to a predefined threshold, a risk-attribution, that is, an identification of the top-k variables responsible for the elevated risk-score.

This method, in some embodiments, comprises several non-exclusive risk assessment strategies which leverage domain experts' knowledge and past information. In some applications, the method may check a user or device blocklist, in which case, the justification for blocking said entity, i.e., relevant KAs, would be saved to the database at time of addition to said blocklist. It may also consist of more complex, user defined rules that encode expert knowledge on what constitutes risky behavior. In this case, should a rule be triggered, the KAs associated with the variables that caused said rule to be triggered are flagged as a source of risk. Finally, it may also contain a machine learning model trained on historic data to discriminate between non-risky and risky events. In this scenario, well-established attribution explanation methods such as Shapley values or LIME could be used to identify the key variables responsible for an elevated risk-score.

The text summary generation is responsible for producing short yet informative summaries for each of the pre-defined KAs. These summaries contain information pertaining to specific variables belonging to the user-selected KA, describing whether or not said information raises suspicion, i.e. an alert, based on the Intelligence Component's analysis.

In an embodiment, summary generation comprises three sub-components: (1) The Prompt Generator, responsible for giving proper context, as well as introducing and framing the data adequately for use by (2) a LLM, which leverages its natural language abilities to produce the textual summary based on the provided data and context, and finally, (3) an Hallucination Detection method, which ensures that no factually incorrect data is included in the produced summary.

These method steps advantageously ensure that, via the generated prompt, all of the necessary data and context is fed to the LLM, along with the Intelligence Component's insights (e.g., whether or not a KA is suspicious). This encourages the LLM to base the generated summary only in the data and the Intelligence Component's output provided, inserting no hallucinations or its own judgements into the summary since it has access to all the necessary information. Guaranteeing that the provided summaries are trustworthy is of extreme importance, as a faulty summary could potentially harm the analysts' decision process.

In an embodiment, for further mitigation of hallucination risk, the Hallucination Detection method may be included, which comprises several hallucination mitigation measures.

In the context of LLMs, prompting refers to the process of providing a textual input or "prompt" to the model, which serves as an instruction or stimulus for the model to generate a textual response. This interaction initiates a dialogue where the model uses its trained understanding of language patterns to produce relevant and coherent outputs based on the input received. To obtain an adequate summary from an LLM, effective prompting is important. Simple phrasing changes, or the introduction of an additional phrase at the end of a prompt may affect the performance of an LLM.

In an embodiment, this method takes into account the propensity of LLMs to produce hallucinations, segments of text within a model's response which are factually incorrect or disconnected from the input prompt.

The task of this sub-method component is to create an adequate prompt given the input data and Intelligence Component outputs, allowing the LLM to generate a summary without introducing its own judgements or hallucinating information due to lack of knowledge in the task's domain.

For better results and to enhance the LLMs capabilities, a RAG approach is implemented. The Prompt Generator, along with a task definition and any necessary restrictions (predefined according to the use-case) for the generation process, includes the data pertaining to the selected KA into the input prompt. Additionally, the risk-score provided by the Intelligence Component, as well as the variables identified by it as responsible for an elevated score, if any exist, are also included in the prompt, thus providing the model with all the necessary knowledge required to produce a relevant summary without needing to extrapolate from its own pre-encoded domain knowledge.

In an embodiment, this information is appended via raw values or group statistics for relevant variables (e.g. "The transaction amount is in the 95th percentile for this account").

In an embodiment, if the KA is identified as a risk source, the prompt encourages the LLM to generate a summary which focuses on the high-risk variables identified by the Intelligence Component. Additionally, the prompt may also specify formatting requirements, such as requesting the LLM to highlight the suspicious variables (e.g. in bold) in the summary. Alternatively, if the KA poses no risk, the model is urged to generate a summary framing the relevant information as unsuspicious.

The purpose of this approach is to ensure that the burden of framing an event and its properties as high or low risk is completely removed from the LLM, as this is a knowledge-intensive and highly domain-dependent judgement that must be carried out by the Intelligence Component. RAG approaches have been shown to significantly reduce the likelihood of hallucinations and improve the quality of LLMs' generations across a variety of domains.

The LLM is tasked with condensing the relevant information provided in the prompt as well as the Intelligence component's risk assessment conclusions into an accessible, short summary.

The RAG approach detailed previously ensures that the model's generation is highly guided and limited, in its content, to the data and judgements, i.e. bias or skewness, provided in the prompt.

In an embodiment, additional measures, such as manipulating the output token sampling are implemented in order to further guarantee that the textual generation sticks to the provided data.

The LLM's function is then to convert the provided data and insights into a succinct textual summary, optionally with highlighted information, which is easier to process by a human analyst.

The hallucination detection serves as a last line of defence to detect and correct any factually incorrect information introduced in the LLM generated summary due to an hallucination. Note also that the likelihood of an hallucination is already significantly reduced by previous steps in the summary generation process, namely the use of an RAG approach and/or a thoroughly engineered prompt.

In an embodiment, the hallucination detection step comprises one or more post-generation hallucination mitigation measures, that is, after the text is already fully generated.

In an embodiment, the hallucination detection is conducted by verifying that any variable related information shown in the summary, such as numerical data, is exactly matched by information also present in the provided prompt, thus ensuring that the generated summary contains only factually correct information. More complex measures may also be added, such as consistency-based uncertainty estimation, which verifies that the model's response is stable when given the same prompt, thus further reducing the risk of an inadequate summary.

Should any hallucination, factual incongruities, or other generation related issues be detected, different approaches can be taken.

In an embodiment, the method refrains from providing a summary altogether. Alternatively, one could ask the model for a limited number of retries, until the summary passes all predefined verification steps. In another embodiment, the method restarts the generation process again with a slightly altered prompt, for example, by selecting different phrasings for the restrictions or the task definition from a pool of carefully designed prompt segments, i.e., finely-tuned prompt segments.

If a generated response obeys all the pre-defined guardrails, this method outputs the summary for the current event. The summary may be stored in association with the current event, so that later requests for this information, such as displaying this case on the UI, may be accelerated.

Similarly to the RAG Summary Method, the Graphics Engine method receives as input the event's data as well as the Intelligence Component's output. Its task is to generate a small set of format-appropriate, informative, and digestible visual representations for each KA in the target domain.

Due to the lack of methods to automatically adjust visual representations, this approach requires a higher level of domain-expert input in the design phase.

In an embodiment, for each KA, the appropriate style of representation is selected for each of the potentially relevant variables which are compatible with graphical representations. For example, in the fraud detection scenario, an account information visual representation may contain many numerical variables, thus entailing the use of density plots, scatter plots, etc., while another KA, such as Geographical Information, may be comprised mostly of categorical variables, thus requiring the use of histograms, sunburst charts, etc.

Nevertheless, certain parts of the visual representation process may be made flexible, allowing the method to dynamically adjust scales, selecting the plots to be shown based on the Intelligence Components' risk attribution (e.g. giving priority to high-risk variables), and even by pointing out specific points in the visualization (e.g. highlighting previously flagged suspicious event's data).

Figure 2:
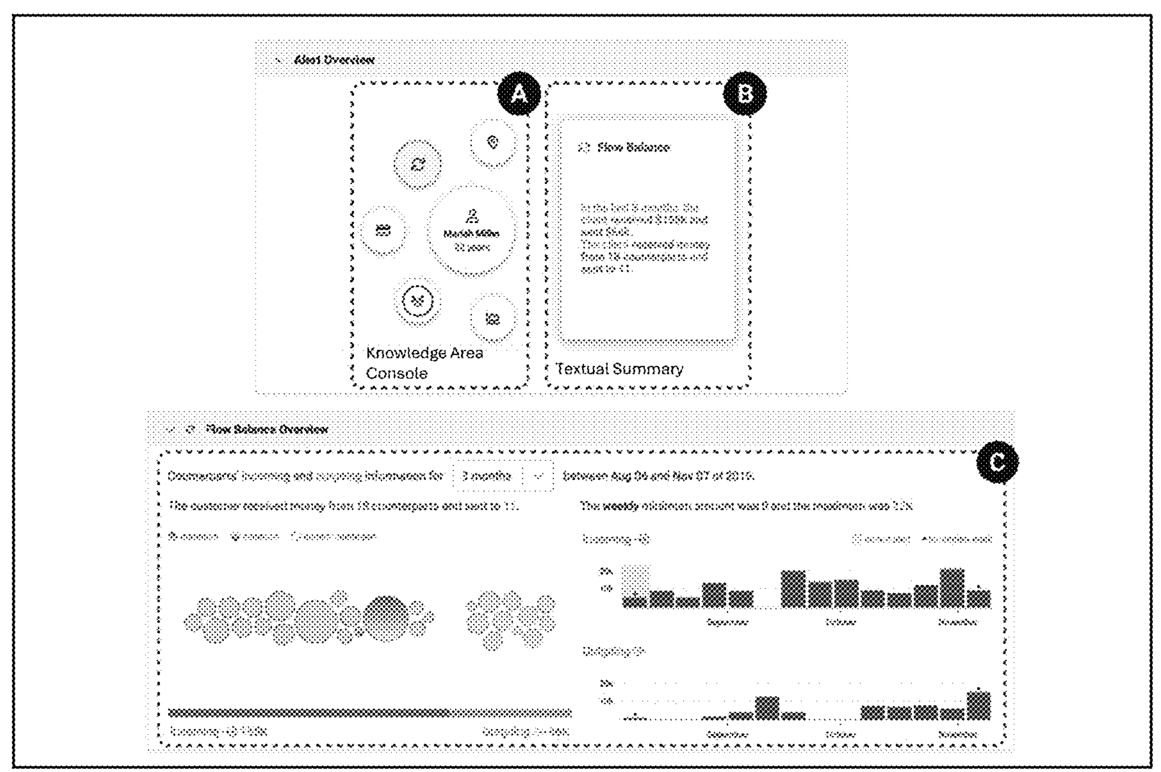
FIG. 2 is a graphical representation illustrating an example interface with multiple levels of detail data exploration, in accordance with one or more implementations of the present disclosure.

FIG. 2 shows a graphical representation of an embodiment of an interface with multiple levels of detail data exploration. The interface is composed of (A) a Knowledge Area Console, which is the starting point of the analysis, where the alert is segmented in the areas that compose it and the analyst is guided to the most relevant KAs; (B) an automatically generated text summary of a selected area; and (C) an interactive graphical representation of all the data points of the selected area.

Herein, the Knowledge Area Console guides the analyst by presenting each area of analysis and highlighting which ones contribute to an elevated risk-assessment. Further, the LLM generates text summary, subject to safety guardrails, containing the relevant information and automated method insights for the selected analysis area. An interactive graphical representation of all the data points of the selected area that varies and is adjusted according to the selection attributes. Each interface element (shown, for example, in FIG. 2 from left to right) has an increased level of detail and can be consulted by the user at any time, preventing context loss and aiding information retrieval.

In an embodiment, the UI includes data pertaining to a record that is available to the analyst, segmented according to KAs, corresponding to high-level concepts that experts consider during the analysis (e.g in the case of fraud: Geographical Information, Bank Account Information, Customer History). FIG. 2 shows three separate components that comprise the UI: (A) a Knowledge Area Console, which is the starting point of the analysis, where the alert is segmented and the analyst is guided to the most relevant KAs, (B) an LLM generated text summary for the selected KA, which states the most pertinent information of the chosen area and where its relevance for the analysis can be assessed, (C) a graphical representation of all the data of each KA, enabling a detailed analysis for specific cases.

In an embodiment, a tabular representation of the data is also shown, allowing for further data exploration if necessary (not shown).

The Knowledge Area Console (A) is the starting point of the analysis and where experts can quickly identify the areas of the data that might require more careful analysis.

In an embodiment, Knowledge Area Console (A) comprises a holistic visual depiction of the data where each concept is represented with an icon. There are as many icons as KAs, which are manually designed by domain experts depending on the use case. Here, users can select the KA for which the method provides the text summary (B) and graphical representation (C) regions.

In an embodiment, an alert is represented as a central element of the Knowledge Area Console (A) since it is the focus of the review for analysts. For the particular example of financial fraud analysts, the alert pertains to a person or entity. This KA corresponds to demographic data and insights about past transactions of the alerted person. Other KAs can be placed around it, as they all derive from the alerted person's activity.

Figure 3:
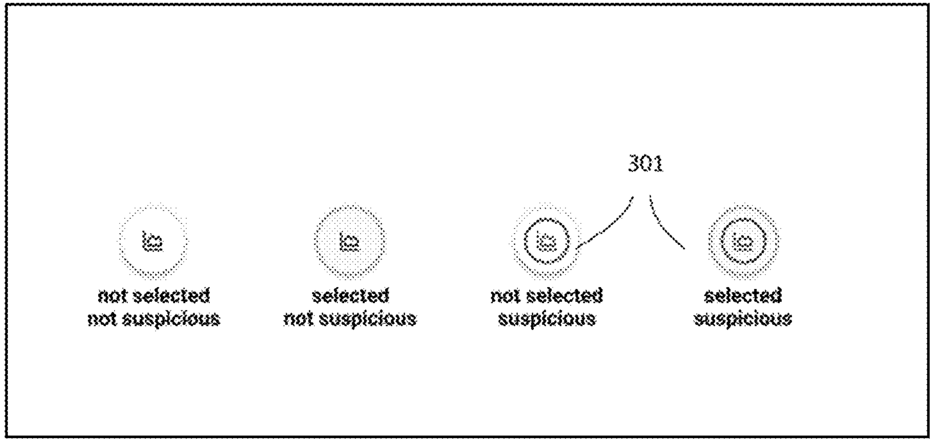
FIG. 3 is an example graphical representation displaying different states of a KA in a console region, in accordance with one or more implementations of the present disclosure.

FIG. 3 shows a graphical representation of an embodiment displaying different states that a KA in the Console region, wherein 301 represents KAs that are identified as containing potentially suspicious behaviour, thus requiring a more careful examination.

In an embodiment, KAs have different visual representations depending on their selection and risk status. This is the first visual clue that communicates to the analyst that something might be out of the ordinary in the data. The interviewed analysts claim that, with this display, they would know what is wrong quicker than in previous displays.

Analysts resort to this region of the interface to quickly gather the most relevant insights about the selected KA and, in case of identified suspicious information, understand what was recognized as risky activity. The main goal of the text summary is to succinctly outline the key values pertaining to the KA, incorporating the insights provided by the automated method. For example, describing how the current event may correspond to an outlier based on risk-assessment methods.

Figure 4:
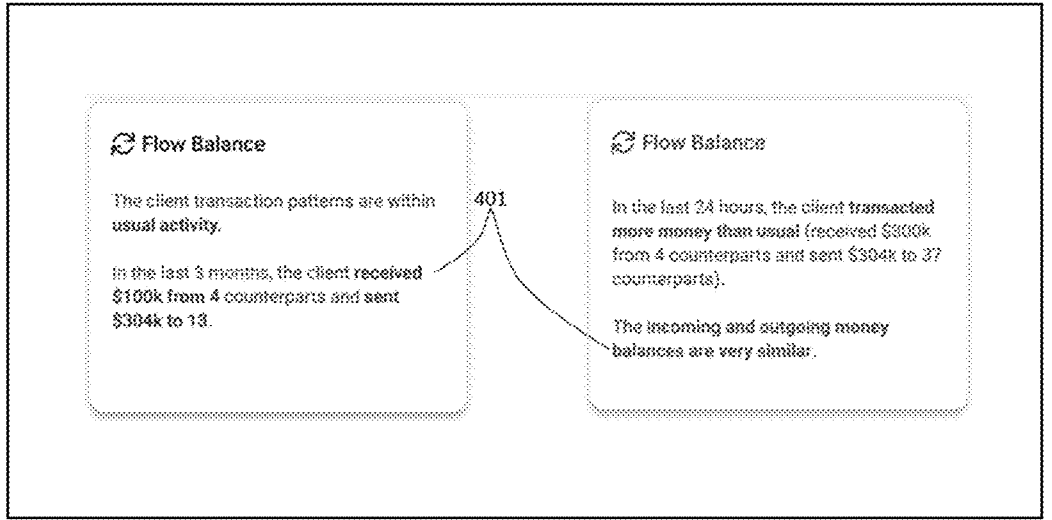
FIG. 4 is an example graphical representation illustrating an example of a text summary of a KA not flagged as fraudulent, and of a KA flagged as fraudulent, in accordance with one or more implementations of the present disclosure.
Figure 5A:
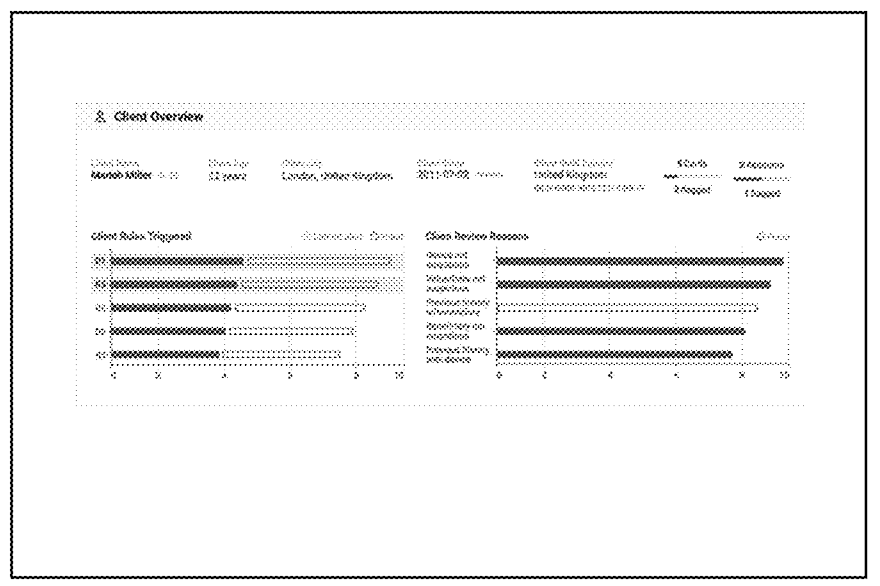
Figure 5B:
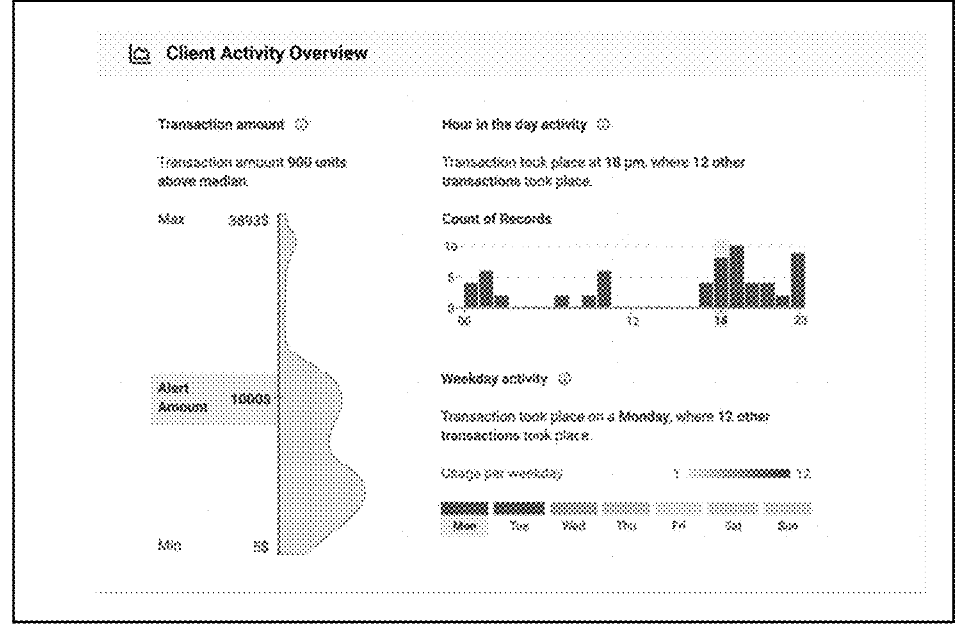
Figure 5C:
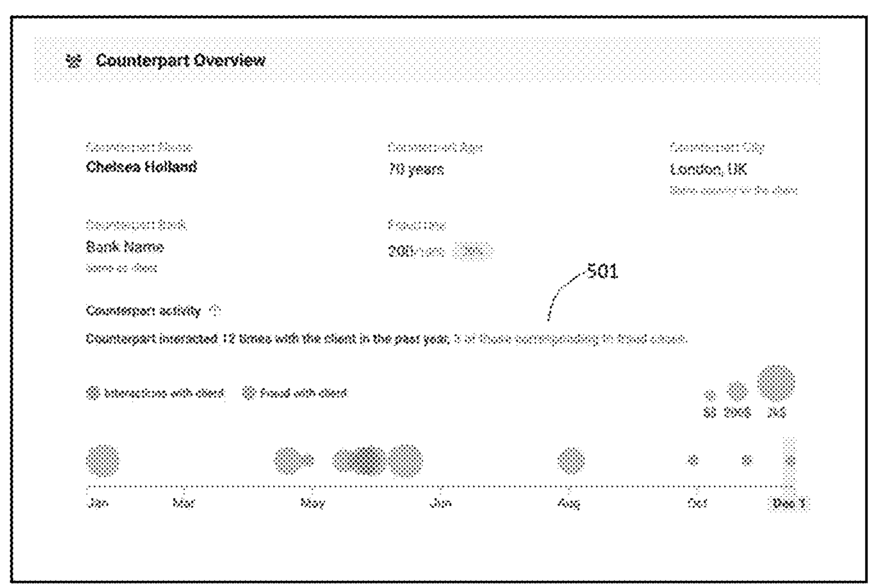
Figure 5D:
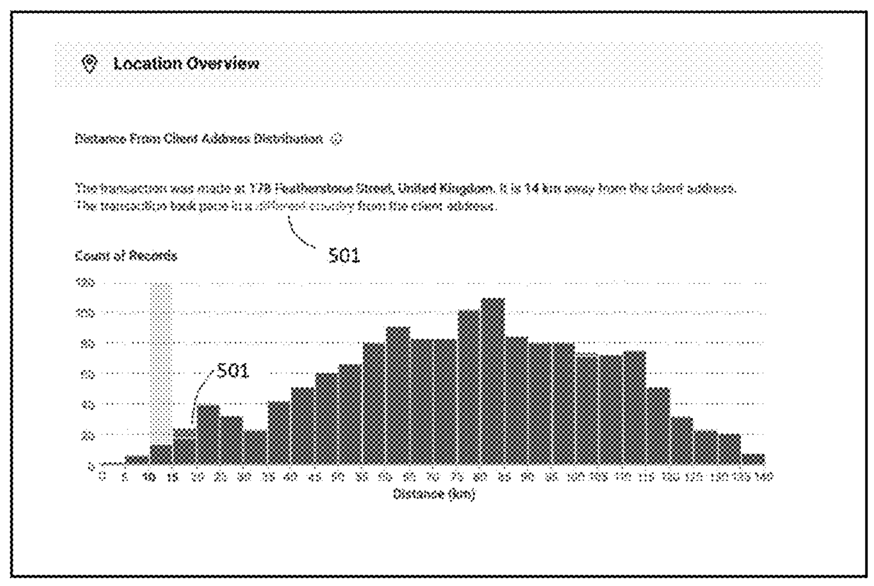
Figure 5E:
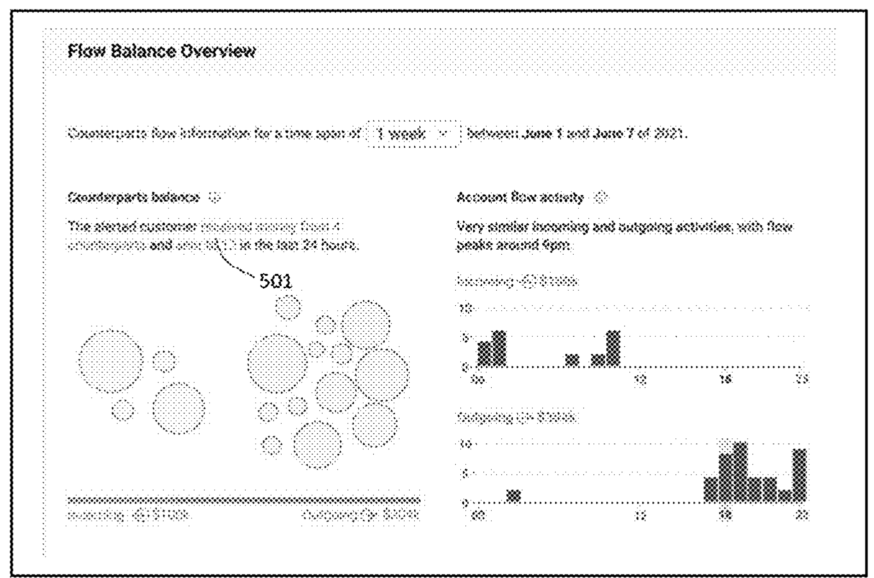

FIG. 4 shows a graphical representation of an embodiment of a KA text summary of a KA not flagged as fraudulent (on the left), and of a KA flagged as fraudulent (on the right), wherein 401 represents a highlighted area.

In an embodiment, if the summary contains any piece of information indicating that the current alert, e.g., an alerted transaction, corresponds to suspicious activity, that area of the text is highlighted, for example using bold and/or a red colour. This summary and text highlights are automatically generated using an LLM, as described previously. The focus of each KA's summary is adjusted not only to the data format of the corresponding subset, but also to the insights that the analysts identified during interviews as being most important for the KA in question.

In the Knowledge Area Graphical Representation interface, all the information that composes a KA is graphically represented. This area is designed for use cases where an exhaustive evaluation of the data is required and to allow analysts to confirm the automated insights provided in the Console (A) and text summary (B) areas, as it has been shown that analysts can be critical of erroneous automated insights. Here, the analyst can visualize sets of graphs designed to represent the historical data of the selected KA. Consider, for instance, the flow balance KA (refer to FIG. 2): it is important for analysts to gather insights about the total incoming and outgoing amounts, the transactional activity evolution through time, and the counterparts involved in it. Here, their goal is to understand if the balance between incoming and outgoing amount or involved counterparts is suspicious.

FIGS. 5A-5F illustrate graphical representations of different embodiments of KAs, wherein 501 represents a highlighted area or text.

Following previous research, familiar visualizations—such as bar charts, histograms, stacked bars, and area plots—were preferred to reduce the analysts' learning curve and thus the information retrieval time.

In an embodiment, each graphical representation is accompanied by a short subtitle which provides a brief summary of the properties of the graph-count of elements, mean, max, and min values, among others.

In an embodiment, the RAG) is a Naive RAG. The Naive approach focuses on three main steps: Indexing: this phase involves curating and sectioning the data into small text chunks, which are encoded into embeddings so that similarity searches can be used in the subsequent phase; Retrieval: a method encodes the query so that similarity search is employed to find the relevant information; Generation: The initial query as well as the retrieved information are concatenated into a final prompt which is fed into the model.

In an embodiment, the step of development of an indexing and retrieval method is not performed, as it is not necessary since the data selection for each individual prompt, as well as conclusions regarding said data, are conducted by the Knowledge Area Parser and Intelligence component respectively.

In an embodiment, to reduce the implementation cost of the disclosed method, a pre-trained model is used to conduct the summarization task.

In an embodiment, the hallucination mitigation steps are conducted at inference time.

In an embodiment, a reduction of top-p or top-k p and k values is performed so that these values would approximate the top-p sampling to the greedy decoding algorithm, thus allowing for a trade-off between variability and factuality.

In an alternative embodiment, it is used uncertainty estimation for detecting hallucinations in LLMs, preferably verbalize-based estimation, which involves asking the LLM to provide an uncertainty estimate along with their answer, and/or consistency-based estimation, which involves quantifying uncertainty by comparing the variability between responses when querying the model with the same prompt.

In a further embodiment, the SelfCheckGPT method, which computes the semantic similarity between separate responses for the same prompt is used in order to further mitigate hallucination risks.

As previously mentioned, RAG itself has been shown to mitigate model hallucinations, constituting another layer of prevention against model hallucinations, being considered an efficient "plug-and-play" solution.

As it is presented previously, efficient and domain-appropriate data visualization is paramount in promoting highly-accurate and time-efficient human decision-making. In systems/methods where a human analyst works in tandem with automated methods, such as the use case presented, data visualization also aids in bridging the gap between both agents, resulting in a more synergistic relationship between them.

The existing methods for efficient data visualization are not appropriate for time-constrained decision-making tasks, as they require user input at analysis time, such as manually adjusting graphics, for example. Furthermore, while certain approaches manage to encode large amounts of data into single graphs, they increase the visualization complexity significantly, thus hindering the information digestion by the analyst.

To fill the gap in simple and versatile data visualization methods it is presented the herein disclosed method, which aims to improve on past proposed data-visualization approaches by segmenting the visualization according to high-level concepts, named KAs, and presenting textual and graphical summaries along with the tabular data pertaining to each concept.

The disclosed method is an innovative approach not only in how data is represented, but also in that it is designed to work in tandem with risk-assessment and attribution methods, incorporating their insights within the textual and graphical representations of the relevant data. The method increases the trustfulness of LLM-based textual summary generation by ensuring that it represents only the conclusions of the Intelligence Component, which is fed into the LLM as context. Furthermore, the Hallucination Detector ensures that only high-quality summaries are shown to the analyst, thus further improving the method's reliability. The graphical data representations are pre-defined by domain-experts, guaranteeing their quality, however, their selection and presentation is made dynamic by selecting which graphics are shown based on the Intelligence Component's output, thus ensuring that only relevant data is shown to the analyst within the method's display. As a final fail-safe, should the analyst feel that they can still not make an informed decision, they have access to the data within the tabular representation.

This method allows for better informed analyst decision-making, especially in time-constrained environments, where analysts must gather as many insights as possible within a few minutes, or even seconds.

Flow diagrams of particular embodiments of the presently disclosed methods are depicted in figures. The flow diagrams illustrate the functional information one of ordinary skills in the art requires to perform said methods required in accordance with the present disclosure.

It will be appreciated by those of ordinary skill in the art that unless otherwise indicated herein, the particular sequence of steps described is illustrative only and can be varied without departing from the disclosure. Thus, unless otherwise stated the steps described are so unordered meaning that, when possible, the steps can be performed in any convenient or desirable order.

It is to be appreciated that certain embodiments of the disclosure as described herein may be incorporated as code (e.g., a software algorithm or program) residing in firmware and/or on computer useable medium having control logic for enabling execution on a computer system having a computer processor, such as any of the servers described herein. Such a computer system typically includes memory storage configured to provide output from execution of the code which configures a processor in accordance with the execution. The present disclosure is also particularly apt for execution on a GPU—graphics processing unit (a specialized processor explicitly designed for executing graphical algorithms), NPU—neural processing unit (a specialized processor explicitly designed for executing machine learning algorithms), or any other inherently parallel processing unit. For example, models were run on Linux PC with Intel Xeon CPU cores and a NVIDIA Geforce RTX. The code can be arranged as firmware or software, and can be organized as a set of modules, including the various modules and algorithms described herein, such as discrete code modules, function calls, procedure calls or objects in an object-oriented programming environment. If implemented using modules, the code can comprise a single module or a plurality of modules that operate in cooperation with one another to configure the machine in which it is executed to perform the associated functions, as described herein.

The term "comprising" whenever used in this document is intended to indicate the presence of stated features, integers, steps, components, but not to preclude the presence or addition of one or more other features, integers, steps, components, or groups thereof.

The disclosure should not be seen in any way restricted to the embodiments described and a person with ordinary skill in the art will foresee many possibilities to modifications thereof. The above-described embodiments are combinable.

The following claims further set out particular embodiments of the disclosure.

REFERENCES

[1] Holistic evaluation of language models. https://crfm-.stanford.edu/helm/lite/latest/#/leaderboard. Accessed: 2024 Apr. 16.

[2] J. Achiam, S. Adler, S. Agarwal, L. Ahmad, I. Akkaya, F. L. Aleman, D. Almeida, J. Altenschmidt, S. Altman, S. Anadkat, et al. Gpt-4 technical report. arXiv preprint arXiv:2303.08774, 2023.

[3] R. H. Alvi, M. H. Rahman, A. A. S. Khan, and R. M. Rahman. Deep learning approach on tabular data to predict early-onset neonatal sepsis. Journal of Information and Telecommunication, 5(2):226-246, 2021.

[4] K. Amarasinghe, K. T. Rodolfa, S. Jesus, V. Chen, V. Balayan, P. Saleiro, P. Bizarro, A. Talwalkar, and R. Ghani. On the importance of application-grounded experimental design for evaluating explainable ml methods. In Proceedings of the AAAI Conference on Artificial Intelligence, volume 38, pages 20921-20929, 2024.

[5] B. Branco, P. Abreu, A. S. Gomes, M. S. C. Almeida, J. a. T. Ascensão, and P. Bizarro. Interleaved sequence rnns for fraud detection. In Proceedings of the 26th ACM SIGKDD International Conference on Knowledge Discovery & Data Mining, KDD '20, page 3101-3109, New York, NY, USA, 2020. Association for Computing Machinery.

[6] N. Cao, C. Shi, S. Lin, J. Lu, Y.-R. Lin, and C.-Y. Lin. Targetvue: Visual analysis of anomalous user behaviors in online communication systems. IEEE Transactions on Visualization and Computer Graphics, 22(1):280-289, 2016.

[7] K. Cobbe, V. Kosaraju, M. Bavarian, M. Chen, H. Jun, L. Kaiser, M. Plappert, J. Tworek, J. Hilton, R. Nakano, et al. Training verifiers to solve math word problems. arXiv preprint arXiv:2110.14168, 2021.

[8] M. De-Arteaga, R. Fogliato, and A. Chouldechova. A case for humans-in-the-loop: Decisions in the presence of erroneous algorithmic scores. In Proceedings of the 2020 CHI Conference on Human Factors in Computing Systems, pages 1-12, 2020.

[9] T. Doi. Effective highlighting modes of graphical user interfaces in visual information search. Universal Access in the Information Society, 22(1):111-119, July 2023.

[10] P. Fernandes, A. Madaan, E. Liu, A. Farinhas, P. H. Martins, A. Bertsch, J. G. de Souza, S. Zhou, T. Wu, G. Neubig, et al. Bridging the gap: A survey on integrating (human) feedback for natural language generation. Transactions of the Association for Computational Linguistics, 11:1643-1668, 2023.

[11] Y. Gao, Y. Xiong, X. Gao, K. Jia, J. Pan, Y. Bi, Y. Dai, J. Sun, and H. Wang. Retrieval-augmented generation for large language models: A survey. arXiv preprint arXiv: 2312.10997, 2023.

[12] J. Heer and B. Shneiderman. Interactive dynamics for visual analysis. Commun. ACM, 55(4):45-54, April 2012.

[13] A. Holtzman, J. Buys, L. Du, M. Forbes, and Y. Choi. The curious case of neural text degeneration. arXiv preprint arXiv:1904.09751, 2019.

[14] A. K. Hopkins, M. Correll, and A. Satyanarayan. Visualint: Sketchy in situ annotations of chart construction errors. Computer Graphics Forum, 39(3):219-228, July 2020.

[15] K. Hu, D. Orghian, and C. Hidalgo. Dive: A mixed-initiative system supporting integrated data exploration workflows. In Proceedings of the Workshop on Human-In-the-Loop Data Analytics, HILDA '18, New York, NY, USA, June 2018. Association for Computing Machinery.

[16] D. Jin, E. Pan, N. Oufattole, W.-H. Weng, H. Fang, and P. Szolovits. What disease does this patient have? a large-scale open domain question answering dataset from medical exams. Applied Sciences, 11(14):6421, 2021.

[17] N. Kandpal, H. Deng, A. Roberts, E. Wallace, and C. Raffel. Large language models struggle to learn long-tail knowledge. In International Conference on Machine Learning, pages 15696-15707. PMLR, 2023.

[18] D. A. Keim, F. Mansmann, J. Schneidewind, J. Thomas, and H. Ziegler. Visual Analytics: Scope and Challenges, pages 76-90. Springer Berlin Heidelberg, Berlin, Heidelberg, 2008.

[19] J. Kielman, J. Thomas, and R. May. Foundations and frontiers in visual analytics. Information Visualization, 8(4):239-246, December 2009.

[20] C. Kinkeldey, J.-D. Fekete, and P. Isenberg. BitConduite: Visualizing and Analyzing Activity on the Bitcoin Network. In A. P. Puig and T. Isenberg, editors, EuroVis 2017—Posters. The Eurographics Association, 2017.

[21] D. V. Kute, B. Pradhan, N. Shukla, and A. Alamri. Deep learning and explainable artificial intelligence techniques applied for detecting money laundering—a critical review. IEEE Access, 9:82300-82317, 2021.

[22] T. Kwiatkowski, J. Palomaki, O. Redfield, M. Collins, A. Parikh, C. Alberti, D. Epstein, I. Polosukhin, J. Devlin, K. Lee, et al. Natural questions: a benchmark for question answering research. Transactions of the Association for Computational Linguistics, 7:453-466, 2019.

[23] P.-M. Law, A. Endert, and J. Stasko. Characterizing automated data insights. In 2020 IEEE Visualization Conference (VIS), pages 171-175, October 2020.

[24] D. J.-L. Lee, H. Dev, H. Hu, H. Elmeleegy, and A. Parameswaran. Avoiding drill-down fallacies with vispilot: assisted exploration of data subsets. IUI '19, page 186-196, New York, NY, USA, March 2019. Association for Computing Machinery.

[25] N. Lee, W. Ping, P. Xu, M. Patwary, P. N. Fung, M. Shoeybi, and B. Catanzaro. Factuality enhanced language models for open-ended text generation. Advances in Neural Information Processing Systems, 35:34586-34599, 2022.

[26] R. A. Leite, T. Gschwandtner, S. Miksch, E. Gstrein, and J. Kuntner. Visual analytics for event detection: Focusing on fraud. Visual Informatics, 2(4):198-212, December 2018.

[27] R. A. Leite, T. Gschwandtner, S. Miksch, S. Kriglstein, M. Pohl, E. Gstrein, and J. Kuntner. Eva: Visual analytics to identify fraudulent events. IEEE Transactions on Visualization and Computer Graphics, 24(1):330-339, 2018.

[28] P. Lewis, E. Perez, A. Piktus, F. Petroni, V. Karpukhin, N. Goyal, H. Küttler, M. Lewis, W.-t. Yih, T. Rocktäschel, et al. Retrieval-augmented generation for knowledge-intensive nlp tasks. Advances in Neural Information Processing Systems, 33:9459-9474, 2020.

[29] P. Liang, R. Bommasani, T. Lee, D. Tsipras, D. Soylu, M. Yasunaga, Y. Zhang, D. Narayanan, Y. Wu, A. Kumar, et al. Holistic evaluation of language models. arXiv preprint arXiv:2211.09110, 2022.

[30] S. Lin, J. Hilton, and O. Evans. Truthfulqa: Measuring how models mimic human falsehoods. arXiv preprint arXiv:2109.07958, 2021.

[31] D. Liu, S. Alnegheimish, A. Zytek, and K. Veeramachaneni. Mtv: Visual analytics for detecting, investigating, and annotating anomalies in multivariate time series. Proc. ACM Hum.-Comput. Interact., 6(CSCW1), April 2022.

[32] S. M. Lundberg and S.-I. Lee. A unified approach to interpreting model predictions. Advances in neural information processing systems, 30, 2017.

[33] C. Maçãs., E. Polisciuc., and P. Machado. Glyphsome: Using som with data glyphs for customer profiling. In Proceedings of the 15th International Joint Conference on Computer Vision, Imaging and Computer Graphics Theory and Applications (VISIGRAPP 2020)—IVAPP, pages 301-308. INSTICC, SciTePress, 2020.

[34] P. Manakul, A. Liusie, and M. J. Gales. Selfcheckgpt: Zero-resource black-box hallucination detection for generative large language models. arXiv preprint arXiv: 2303.08896, 2023.

[35] C. Maçãs, E. Polisciuc, and P. Machado. Atovis—a visualisation tool for the detection of financial fraud. Information Visualization, 21(4):371-392, 2022.

[36] X. Mu, K. Xu, Q. Chen, F. Du, Y. Wang, and H. Qu. MOOCad: Visual Analysis of Anomalous Learning Activities in Massive Open Online Courses. In J. Johansson, F. Sadlo, and G. E. Marai, editors, EuroVis 2019—Short Papers. The Eurographics Association, 2019.

[37] P. H. Nguyen, R. Henkin, S. Chen, N. Andrienko, G. Andrienko, O. Thonnard, and C. Turkay. Vasabi: Hierarchical user profiles for interactive visual user behaviour analytics. IEEE Transactions on Visualization and Computer Graphics, 26(1):77-86, 2020.

[38] J. Obeid and E. Hoque. Chart-to-text: Generating natural language descriptions for charts by adapting the transformer model. In Proceedings of the 13th International Conference on Natural Language Generation, pages 138-147. Association for Computational Linguistics, October 2020.

[39] R. Ramaiya and S. Rogers. A colossal $159 billion lost to fraud and scams, finds new research from Feedzai and the Global Anti-Scam Alliance, February 2024.

[40] M. T. Ribeiro, S. Singh, and C. Guestrin. "why should i trust you?" explaining the predictions of any classifier. In Proceedings of the 22nd ACM SIGKDD international conference on knowledge discovery and data mining, pages 1135-1144, 2016.

[41] J. Rzeszotarski and A. Kittur. Crowdscape: interactively visualizing user behavior and output. In Proceedings of the 25th Annual ACM Symposium on User Interface Software and Technology, UIST'12, page 55-62, New York, NY, USA, 2012. Association for Computing Machinery.

[42] M. A. Sheikh, A. K. Goel, and T. Kumar. An approach for prediction of loan approval using machine learning algorithm. In 2020 international conference on electronics and sustainable communication systems (ICESC), pages 490-494. IEEE, 2020.

[43] P. Silva, C. Maçãs, E. Polisciuc, and P. Machado. Visualisation tool to support fraud detection. In 2021 25th International Conference Information Visualisation (IV), pages 77-87, 2021.

[44] H. Strobelt, D. Oelke, B. C. Kwon, T. Schreck, and H. Pfister. Guidelines for effective usage of text highlighting techniques. IEEE Transactions on Visualization and Computer Graphics, 22(1):489-498, January 2016.

[45] N. Sultanum and A. Srinivasan. Datatales: Investigating the use of large language models for authoring data-driven articles. In 2023 IEEE Visualization and Visual Analytics (VIS), pages 231-235, October 2023.

[46] B. J. Tang, A. Boggust, and A. Satyanarayan. Vistext: A benchmark for semantically rich chart captioning. arXiv preprint arXiv: 2307.05356, June 2023.

[47] H. Touvron, T. Lavril, G. Izacard, X. Martinet, M.-A. Lachaux, T. Lacroix, B. Rozi'ere, N. Goyal, E. Hambro, F. Azhar, et al. Llama: Open and efficient foundation language models. arXiv preprint arXiv: 2302.13971, 2023.

[48] J. Wei, X. Wang, D. Schuurmans, M. Bosma, F. Xia, E. Chi, Q. V. Le, D. Zhou, et al. Chain-of-thought prompting elicits reasoning in large language models. Advances in neural information processing systems, 35:24824-24837, 2022.

[49] Y. Zhang, Y. Li, L. Cui, D. Cai, L. Liu, T. Fu, X. Huang, E. Zhao, Y. Zhang, Y. Chen, et al. Siren's song in the ai ocean: a survey on hallucination in large language models. arXiv preprint arXiv: 2309.01219, 2023.

[50] J. Zhao, N. Cao, Z. Wen, Y. Song, Y.-R. Lin, and C. Collins. #fluxflow: Visual analysis of anomalous information spreading on social media. IEEE Transactions on Visualization and Computer Graphics, 20(12):1773-1782, 2014.

What is claimed:

1. A computer-implemented method for generating, verifying and providing information in an interactive graphical user interface, comprising the steps of:

receiving, by at least one computing device, a plurality of transactional data records, each of the plurality of data records having a plurality of data attributes;

automatically classifying, by the at least one computing device:

at least one of the plurality of transactional data records into one or more classes of a first classification, as a function of the data attributes; and the at least one of the plurality of transactional data records into one or more classes of a second classification, as a function of the data attributes and the first classification;

receiving, by the at least one computing device via the graphical user interface, a user selection of a class of the first classification;

dynamically generating, in response to the user selection, a plurality of text summaries, each including the one or more classes of the second classification for the at least one of the plurality of transactional data records having data attributes associated with the user selection, wherein generating each respective one of the text summaries includes:

automatically generating, by the at least one computing device, a prompt for a text summary of the selected class and the at least one class of the second classification;

providing the generated prompt to a text generator model; and receiving, from the text generator model in response to the prompt, the generated respective text summary;

automatically verifying, by the at least one computing device, that data present in each of the plurality of generated text summaries are present in all of the plurality of generated text summaries;

providing, by the at least one computing device, at least one of plurality of the generated text summaries via the graphical user interface;

providing, via the graphical user interface, a graphic representation for the selected class;

providing, by the at least one computing device via the graphical user interface, the received plurality of transactional data records as tabular data; and displaying, via the graphical user interface, the at least one of the plurality of the generated text summaries, the graphic representation, and the tabular data, including by highlighting part or parts of the at least one of the plurality of the generated text summaries, wherein the part or parts correspond to a class or classes from the second classification attributed to the received data records having been attributed the selected class.

2. The method according to claim 1, wherein generating the text summary further comprises generating a text summary of the class or classes attributed by the first classification and generating a text summary of the class or classes attributed by the second classification.

3. The method according to claim 1, further comprising displaying the classes obtained from the first classification.

4. The method according to claim 1, wherein the second classification is orthogonal in respect to the first classification.

5. The method according to claim 1, further comprising the display of classes obtained from the first classification, wherein first classification classes for which a preponderance of a class from the second classification are highlighted.

6. The method according to claim 1, further comprising highlighting part or parts of the generated graphic representation, in particular the part or parts being those corresponding to a class or classes from the second classification attributed to the received data records having been attributed the selected class, further in particular the part or parts being those corresponding to a class or classes from the second classification above a predetermined classification threshold.

7. The method according to claim 1, wherein the text generator model is an LLM, including a transformer-based model.

8. The method according to claim 1, wherein the first classification is based in a predetermined knowledge-area; and/or the second classification is based in a predetermined risk class.

9. The method according to claim 1, wherein classifying comprises applying a pretrained discriminative model, in particular the pretrained discriminative model comprising feature embedding pre-obtained from training transactional data records and corresponding classification.

10. The method according to claim 1, further comprising one or more of:

verifying if all numerical data present in the generated text summary is present in the received data records or present in numerical statistics computed from the received data records, in particular the numerical statistics comprising average, sum, median, deviation, minimum or maximum; and previously including instructions in the prompt for explicitly generating precalculated numerical statistics computed from the received data records and verifying if all numerical data present in the generated text summary is present in the precalculated numerical statistics.

11. A computer-implemented system for generating, verifying and providing information in an interactive graphical user interface, the system comprising:

at least one computing device including a memory accessing instructions stored on non-transitory processor readable media that, when executed configure the at least one computing device to:

receive a plurality of transactional data records, each of the plurality of data records having a plurality of data attributes;

automatically classify:

at least one of the plurality of transactional data records into one or more classes of a first classification, as a function of the data attributes; and the at least one of the plurality of transactional data records into one or more classes of a second classification, as a function of the data attributes and the first classification;

receiving, by the at least one computing device via the graphical user interface, a user selection of a class of the first classification;

dynamically generating, in response to the user selection, a plurality of text summaries, each including the one or more classes of the second classification for the at least one of the plurality of transactional data records having data attributes associated with the user selection, wherein generating each respective one of the text summaries includes:

automatically generating, by the at least one computing device, a prompt for a text summary of the selected class and the at least one class of the second classification;

providing the generated prompt to a text generator model; and receiving, from the text generator model in response to the prompt, the generated respective text summary;

automatically verifying, by the at least one computing device that data present in each of the plurality of generated text summaries are present in all of the plurality of generated text summaries;

providing, by the at least one computing device, at least one of plurality of the generated text summaries via the graphical user interface;

providing, via the graphical user interface, a graphic representation for the selected class;

providing, by the at least one computing device via the graphical user interface, the received plurality of transactional data records as tabular data; and displaying, via the graphical user interface, the at least one of the plurality of the generated text summaries, the graphic representation, and the tabular data, including by highlighting part or parts of the at least one of the plurality of the generated text summaries, wherein the part or parts correspond to a class or classes from the second classification attributed to the received data records having been attributed the selected class.

* * * * *